US00RE36085E

United States Patent [19]

McLaughlan et al.

[11] E Patent Number: Re. 36,085

[45] Reissued Date of Patent: Feb. 9, 1999

[54] CHAIN LINK FENCING WITH DECORATIVE SLATS THAT PROVIDE COMPLETE PRIVACY

[76] Inventors: Gerald J. McLaughlan, 3330 W. 3615 South, West Valley, Utah 84119; Robert G. Cluff, 4956 S. Jordan Canal Rd., Taylorsville, Utah 84118

[21] Appl. No.: 517,243

[22] Filed: Aug. 21, 1995

Related U.S. Patent Documents

Reissue of:

[64] Patent No.: 5,395,092
Issued: Mar. 7, 1995
Appl. No.: 59,130
Filed: May 10, 1993

[51] Int. Cl.[6] ..... B21F 27/00

[52] U.S. Cl. ..... 256/34; 256/32

[58] Field of Search ..... 256/1, 32, 34, 256/49, 47, 50

[56] References Cited

U.S. PATENT DOCUMENTS

| | | | |
|---|---|---|---|
| 1,727,779 | 9/1929 | Marengo | 256/1 |
| 3,285,577 | 11/1966 | Pinson | 256/34 |
| 4,723,761 | 2/1988 | Cluff | 256/32 |
| 4,860,997 | 8/1989 | Schoenheit et al. | 256/34 |
| 5,056,761 | 10/1991 | Meglino et al. | 256/34 |

FOREIGN PATENT DOCUMENTS

| | | | |
|---|---|---|---|
| 3033880 | 4/1981 | Germany | 256/1 |
| 3236235 | 4/1984 | Germany | 256/1 |

*Primary Examiner*—Thomas E. Denion
*Attorney, Agent, or Firm*—Christensen O'Connor Johnson & Kindness PLLC

[57] ABSTRACT

Chain link fencing having a plurality of elongate picket members comprising elongate slats that lie in diagonal valleys of the chain link fencing. Elongate, U-shaped channels lie along the respective sides of each elongate slat. The channels fit over and cover a row or ridge of knuckles formed along the side of each of the respective valleys of the chain link fencing. The pickets cover essentially the entire side of the chain link fence and leave no spaces or openings between pickets. The system thus provides complete privacy. Engagement members are associated with the channels to secure the channel members and thus the pickets to respective rows or ridges of knuckles on the chain link fencing.

14 Claims, 6 Drawing Sheets

CHAIN LINK FENCING WITH DECORATIVE SLATS THAT PROVIDE COMPLETE PRIVACY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to chain link fencing having a plurality of decorative, elongate members that provide complete privacy by blocking the view through the fence. Heretofore, slats have generally been woven through the links of the chain link fabric of the fence. Such slats do not provide complete privacy inasmuch as they block only a portion of the view through the fence. The present invention in particular relates to improved decorative picket members similar to slats but which are positioned diagonally in elongate, diagonal valleys formed in the chain link fencing. The decorative picket members have means associated therewith for completely blocking the view through the fence to thereby provide complete privacy. Novel means of attachment are provided for securing the elongate picket members to the chain link fencing. The attachment means secures the picket members in a uniform position along the fence while providing interlocking engagement between the picket members and the chain link fencing.

2. State of the Art

It is well known to insert slats in chain link fences to provide increased privacy and to improve the appearance of the fence. Unfortunately, there are two somewhat related, serious problems encountered in using slats in chain link fencing. First, the slats have a tendency to shift longitudinally after being inserted in the wire fabric of the chain link fence so as to become disarranged and uneven. Disarranged, uneven slats greatly impair the appearance of the fence. In addition, the loosely positioned slats are easy prey for vandals. The slats are, unfortunately, easily removed from the fence by vandals.

The second problem is that of lack of complete privacy. When the slats are positioned side-by-side in vertical orientation within adjacent channels in the chain link fencing or in diagonal orientation within adjacent valleys in the chain link fencing, an elongate open space is formed between the adjacent slats. This elongate space is needed to accommodate the intertwined wires of the chain link fabric. When using conventional slats that are either woven in the channels of the chain link fencing or disposed in the diagonal valleys of the chain link fencing, nearly ¼ of the area of the fence remains as open spaces between adjacent slats, and one can easily view through the open spaces. Complete privacy is not possible.

Several methods have been proposed to alleviate the first problem mentioned above. The slats have been secured to the chain links in the fence by using staples, nails and other fasteners. In addition, systems have been proposed for interlocking the slats with channel members or elongate rigid connecting members which run along the length of the fence and which engage the slat members. The installation of such systems is a tedious, time consuming, costly operation. Prior to two U.S. patents which have been recently issued to me, no inexpensive, expedient means had been proposed to effectively cope with the vandalism problem. Some of the prior patent literature suggest complex systems which to some degree alleviates the vandalism problem, but as stated previously, these systems are unfortunately rather costly and require tedious, time consuming installation. Representative U.S. Patents which have been directed to retaining slats in position in chain link fences are:

2,760,759 3,037,593 4,085,954

2,802,645 3,069,142 4,512,556.

The second problem mentioned above, ie., the lack of privacy due to open longitudinal spaces existing between the slats that are inserted into the channels of the chain link fabric, has not been significantly addressed by the prior art. In our copending application Ser. No. 07/765,967 filed Oct. 26, 1991, a system is provided that achieves essentially complete privacy. The system of our copending application uses a plurality of elongate picket members that are positioned alongside one of the external side faces of the wire fencing. Separate mounting members must then be either woven through the wire fencing or positioned on the opposite side of the fencing. Engagement members are then used to engage or interconnect the picket members along the length of the picket member. Although essentially complete privacy and an attractive fence is achieved in accordance with our copending application, the system is rather costly. It would be highly advantageous to provide a simpler system that is less costly and still provides the complete privacy of our previous system disclosed in our copending application Ser. No. 07/765,967.

Applicants are aware of an aborted attempt some twenty years or more ago wherein thin aluminum slats were roll formed. The thin aluminum slats had a crude, open-faced channel running along one of the sides of the slats, and the slats were positioned diagonally within valleys in the chain link fencing. The crude, open-faced channels covered the ridges of knuckles at the sides of the valleys to provide essentially complete privacy. However, a complex system using thin aluminum slats without channels running perpendicular to the slats having the channels was used to retain all slats in the chain link fencing. Installation of such a system was highly labor intensive and therefor very expensive. The system was not used extensively because of the complexity and expense of its installation.

3. Objectives

A principal objective of the present invention is to provide a novel chain link fence system using elongate slat-like, picket members positioned on one side of the chain link fencing, with the picket members lying in diagonal valleys formed in the wire fabric of the chain link fence.

A particular objective of the present invention is to provide such a picket system for chain link wire fencing an elongate, generally U-shaped channel is associated with each picket member. The channel runs lengthwise along one side of the picket member, with the U-shaped channel forming an open trough that covers the diagonal row of intertwined wires of the chain link fence fabric. The intertwined wires form a ridge of knuckles and wires connecting the knuckles that parallels each diagonal valley in the wire fabric of the chain link fence. The U-shaped channel of the pickets of the present invention covers over this ridge. Means are provided for interlocking engagement between the picket member of the present invention and the chain link fence. When the picket members, with their associated channels, are installed in each of the channels of a chain link fence, they form an absolute light barrier to provide complete privacy.

SUMMARY OF THE INVENTION

The above objectives are achieved in accordance with the present invention by providing a novel system for use in a chain link fence. The system comprises elongate picket members formed by elongate slats, with the slat of each picket member having a width that fits within a diagonal valley of the chain link fence. The elongate slat is preferably made of a plastic material and can have any thickness as desired. Usually, the thickness need be no more than about 0.025 inch to 0.125 inch. The slats can, if so desired be flattened tubular slats such as those disclosed in U.S. Pat. Nos. 4,723,761 and 4,725,044.

The slats lie in the diagonal valleys of the chain link fence. Diagonal rows or ridges of knuckles are formed from intertwined wires of the chain link fabric and are positioned opposite sides of the valleys of the chain link fencing. The slats lie in the valleys between the diagonal rows or ridges of knuckles. A U-shaped channel member is provided to cover the respective diagonal row or ridge of knuckles. The channel is preferably made of a plastic material and can be extruded as an integral part of the slat. Alternatively, the channels can be formed of distinct units separate and apart of the slats, with the channels interlocking with the slats to hold the slats in the valleys of the chain link fencing.

The U-shaped channel forms an open trough at the top side of the channel that fits over and covers the diagonal row or ridge of knuckles adjacent to each slat in the chain link fence. Novel engagement means are provided for engaging the opposed sides of the U-shaped channel to the diagonal row or ridge of knuckles. When picket members of the present invention are installed in each of the valleys of a chain link fence, the slats and the associated U-shaped channels cover the entire face of the chain link fence to provide complete privacy.

Attachment means, at least a portion of which is formed integrally in at least one of the sidewalls of the U-shaped channels, are provided for engaging the picket members, i.e., the slats and their associated channels, to the fabric of the chain link fence. In a preferred embodiment, the attachment means comprise lips extending inwardly from the opposite sidewalls of the channel adjacent to the open side of the channel. The knuckles forming the rows or ridges along sides of the valleys of the chain link fence slip into the channel, and the lips engage the opposite sides of the knuckles to hold the picket firmly on the row of knuckles and, thus, on the chain link fence. Plug members can, if desired, be inserted into the channel at positions between adjacent knuckles to physically capture the portion of the wire of the fence that extends between the knuckles in the channel. The plug members thus provide a secondary, positive interlock of the pickets to the chain link fence.

The attachment means can also comprise a series of spaced tabs or projections extending from an opposite side of the slat, i.e. the side opposite that to which the U-shaped channel is attached. The tabs or projections extend through respective openings or apertures in a corresponding U-shaped channel on an adjacent picket member positioned along an adjacent valley of the chain link fence. The tabs or projections capture a portion of the wire of the fabric of the chain link fence in that U-shaped channel. The capturing of the portion of the wire of the chain link fence in the U-shaped channel locks the picket member in place on the chain link fence.

In place of spaced tabs or projections extending from the opposite side of the slat portion of the picket members, clip members of various shapes and sizes can be used. The clip members interengage with aligned openings or apertures in the channels of the picket members and again capture portions of the wire of the chain link fence in the channels. Several clip members will be more fully disclosed in the following detailed description portion of this disclosure.

Additional objects and features of the present invention will become apparent from the following detailed description, taken together with the accompanying drawings.

BRIEF DESCRIPTION OF THE DRAWINGS

Preferred embodiments of the present invention representing the best modes presently contemplated of carrying out the invention are illustrated in the accompanying drawings, in which.

DETAILED DESCRIPTIONS OF THE PREFERRED EMBODIMENTS

Figure 1:
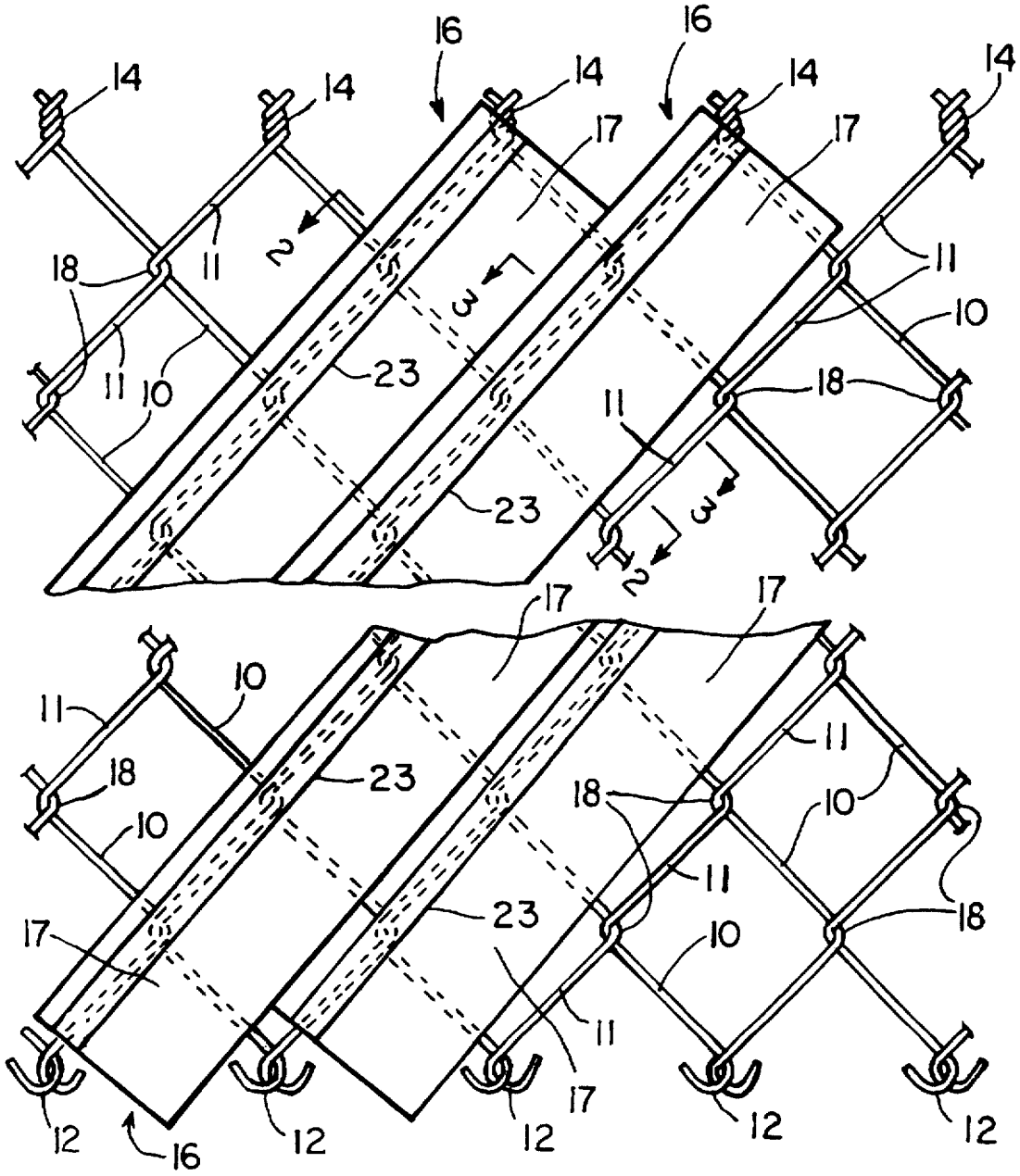
FIG. 1 is a view in elevation of a portion of a chain link fence showing two decorative picket members of the present invention being installed in a corresponding, adjacent diagonal valleys of the fabric of the chain link fence (the completed fence would, of course have picket members installed in all the diagonal valleys of the fabric of the chain link fence)

The present invention relates to a system of diagonal pickets installed on an otherwise conventional chain link fencing. As shown in FIG. 1, the chain link fencing has elongate wires that are bent in zig-zag manner and interlocked in intertwined junctions or knuckles 18 with one another to form a chain link fabric comprising a plurality of links 10 and 11. The bottom ends of adjacent wires of the chain link fabric may be interconnected by reversely bent end portions 12, and, in the past, the upper ends of adjacent wires were commonly interconnected by twisting the upper portions together as shown in FIG. 1. The twisted upper portions 14 present rather sharp barbs which discourage attempts to climb over the fence. Because of the inherent danger of the twisted upper portions 14, it has been the preference of some to invert the chain link fabric so as to place the twisted end portions 14 at the bottom. Chain link fencing has also been made so as to have the reversely bent end portions 12 at the upper ends as well as the lower ends of the wires of the chain link fencing.

As illustrated in FIG. 1, two picket members 16 in accordance with the invention are shown in place in two adjacent, diagonal valleys of fabric of the chain link fence. In the completed fence, of course, similar picket members 16 would be installed in each of the diagonal valleys of the fabric of the chain link fence. The valleys are formed by the links 10 of the fabric of the chain link fence that extend downwardly from intertwined junctions or knuckles. 18 and extend across the valley substantially perpendicular to the longitudinal length of the valley. A pair of rows or ridges is formed on each side of each valley by junctions or knuckles 18 and the links 11 of the fabric of the chain link fence that extend between the knuckles 18 and are parallel with the valley. There is, of course, a ridge or row of knuckles 18 positioned on each side of each of the valleys.

The picket members can be made of any available material, such as wood, metal or plastics. In one preferred embodiment of the invention, the picket members 16 are made of plastics and are extruded as an integral member comprising the different components thereof as are described hereinafter. In an alternative embodiment, the picket members 16 are formed from two distinct, separate components. This alternative embodiment will also be described hereinafter.

In both the embodiments in which the picket members 16 are formed as an integral member or formed as two distinct, separate, principal members, the picket members 16 are formed from elongate slats 17 that have a length sufficient to extend the length of the diagonal valley in the chain link fencing. The slats 17 have a width sufficient to fit within the respective valleys of the chain link fence. The slats 17 can have a relatively thin thickness of from about 0.025 to 0.125 inch. Instead of the flat slats 17 as illustrated in the drawings, the slats 17 could be formed as flattened, tubular shaped members as are well known in the chain link fence art. Such tubular slats are fully described and shown in U.S. Pat. Nos. 4,723,761 and 4,725,044.

The slats 17 have opposite first and second elongate sides 20 and 21 as best shown in FIGS. 2–7, 9 and 12. In the embodiment of the invention shown in FIGS. 3–7, an elongate, U-shaped channel 23 is formed integrally along a first side 20 of the slat 17. The U-shaped channel 23 is formed from first and second spaced apart sidewalls 25 and 26 that are connected by a bottom wall 27. The U-shaped channel 23 forms an elongate trough that is open along the top side of the channel 23. The first side 20 of the slat 17 is integrally attached to the first sidewall 25 of the U-shaped channel 23. When the slat 17 is received in a valley of chain link fencing, the open trough fits over a diagonal row or ridge of knuckles 18 that is formed along the side of the valley by the intertwined wires of the chain link fencing. The channel 23 completely covers the diagonal row or ridge of knuckles 18.

Attachment means are provided for securing the U-shaped channel 23 to the diagonal row or ridge of knuckles 18 that is covered by the channel 23. As illustrated in FIGS. 2–7, a projection 30 is positioned adjacent to the open trough at the top side of the channel 23. The projection 30 extends inwardly from one sidewall of the channel 23 toward the other sidewall of the channel 23. As illustrated, it is preferred to have two projections 30 extending inwardly toward each other from opposite sidewalls 25 and 26 of the channel 23. the projections 30 are preferably formed as continuous, projecting lips that extend along the entire length of the channel 23. However, it should be recognized that the projections 30 could just as well be formed as a series of spaced apart tabs formed along the sidewall of the channel 23. The projections 30, whether formed as a continuous lip or a series of spaced apart tabs, preferably slant slightly toward the bottom wall 25 of the channel 23 to form a barb-like engagement member.

Figure 2:
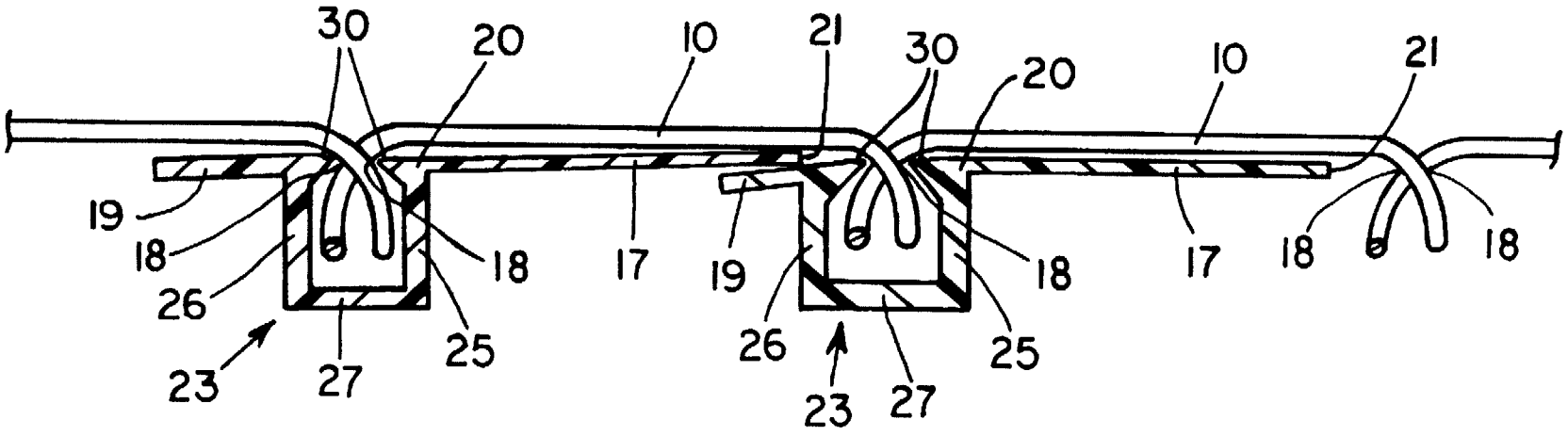
FIG. 2 is a cross section taken on line 2—2 of FIG. 1 showing the two picket members installed in their side-by-side positions in adjacent valleys of the fabric of the chain link fence, and further showing the engagement of the lips of a preferred form of the attachment means as shown with the knuckles on the chain link fencing.

As best shown in FIG. 2, the knuckles 18 formed by the intertwined wires of the chain link fencing slip into the channel 23 through the projections 30 at the open side of the channel 23. The knuckles 18 have naturally formed "v" indentions on their opposite sides, and the projections 30 of the channel 23 securely engage these indentions at the opposite sides of the knuckles 18. The projections 30 firmly hold the channel 23 and the slat 17 which is attached to the channel 23 to the row or ridge of knuckles with the slat 17 lying in the valley adjacent to the row or ridge of knuckles 18. The channels 23 are easily and quickly snapped onto the row or ridge of knuckles 18. Thus, the installation of the pickets 16 of the present invention is not labor intensive, and the pickets 16 are installed relatively inexpensively.

Figure 3:
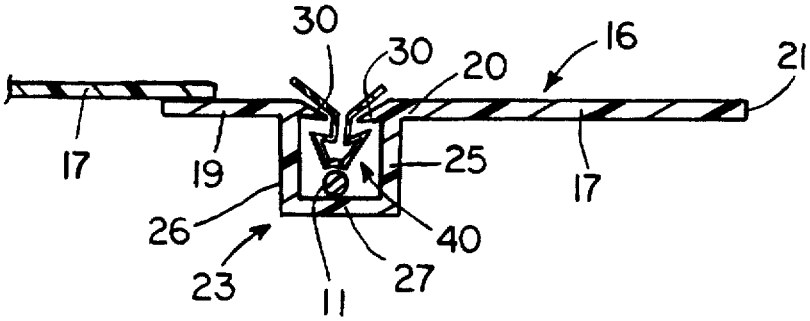
FIG. 3 is a cross section taken along line 3—3 of FIG. 1 showing a plug member inserted in the channel at a position between adjacent knuckles to capture the wire that extends between the knuckles.

As illustrated in FIGS. 1–7 of the drawings it is advantageous to provide the pickets 16 with a second elongate slat 19 that is integrally attached to and extends from the second sidewall 26 of the channel 23. The second slat 19 advantageously has a width that is considerably less than the first slat 17 but could be of the same size if so desired. The only essential requirement is that the second slat 19 will lie in an adjacent valley of the chain link fencing. As shown in FIGS. 2 and 3, the second slat 19 overlaps with a first slat 17 of a picket in an adjacent valley of the chain link fencing. The overlapping of the slats 17 and 19 allow the pickets to be used on various chain link fencing irrespective of mesh size of the chain link fencing or of how tightly the chain link fencing is stretched when it is installed. Irrespective of the mesh size or the degree of stretching of the chain link fencing, one standard size of pickets 16 of the present invention that have two slats 17 and 19 is capable of providing complete privacy when installed on the fencing. The pickets 16 need not be made in various sizes to accommodate various sized fencing.

Figure 8:
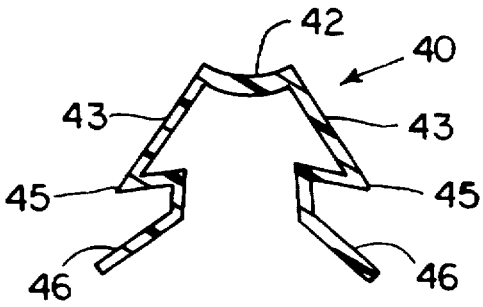
FIG. 8 is a an enlarged cross section through the preferred embodiment of a plug member as shown in FIG. 3 to lock channel members of the system of the present invention to chain link fencing.
Figure 12:
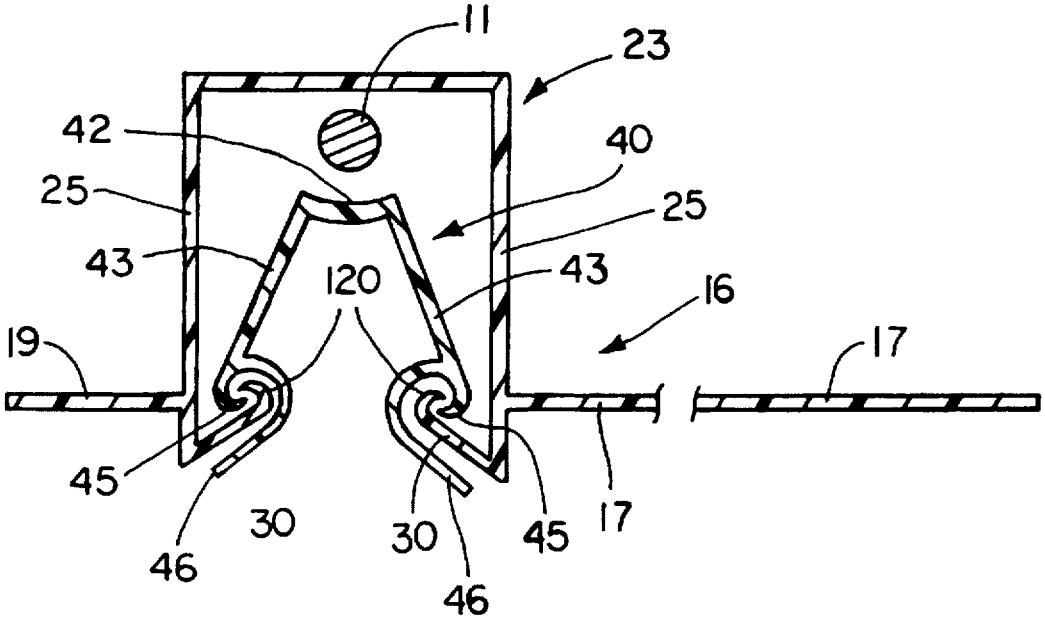
FIG. 12 is an enlarged cross section of a modified embodiment of a picket member and plug member similar to that of FIG. 3 but which has an alternative embodiment of a positive, interlocking engagement means between the plug member and the channel portion of the picket member.

Modified embodiments of attachment means for attaching the picket 16 in accordance with the invention is illustrated in FIGS. 3, 8 and 12. A plug member 40 is inserted into each channel 23 at a position between adjacent knuckles 18 to interlock the channel 23 with the portion of the intertwined wire or link 11 of the chain link fencing that extends between adjacent knuckles 18 and is positioned in the channel 23. The portion of the wire that is restrained by the plug member 40 is one of the links 11 of the chain link fencing that extends parallel to the valley in which the slat 17 of the picket 16 is installed. The plug member 40 closes the open trough of the channel 23 and captures the link 11 of the fencing in the channel 23. This securely attaches the channel 23 to the fencing. When used in combination with the projections 30 of the channel 23 that grab the knuckles 18 of the chain link fencing, the pickets 16 are secured to the fencing.

Cross sections of two similar, preferred embodiments of the plug member 40 are shown in FIGS. 8 and 12. The plug member 40 preferably has a curved or flat base portion 42 that will abut the link 11 of the chain link fencing when the plug member 40 is inserted into a channel 23 as shown in FIGS. 3 and 12. The opposite sides 43 of the plug member 40 extend backwardly from the base portion 42. The base portion 42 is of a size that can be easily inserted into the open trough of the channel 23 between the projections 30. The sides 43 slant away from each other and have barbs 45 thereon.

Finger engagement portions 46 of the sides 43 of the plug member 40 extend beyond the barbs 45. When the finger engagement portions 46 are squeezed toward each other, the barbs 45 can be inserted past the projections 30 and into the channel 23. When the finger engagement portions 46 are then released, the barbs 45 spring outwardly into firm engagement with the projections 30 such that the plug member 40 is secured within the channel 23. The extending portions 46 are preferably shaped so as to lie close to the exterior sides of the projections 30 of the channel 23 when inserted into the channel 23 so that the plug members 40 are essentially inconspicuous.

As shown in FIG. 12, the barbs 45 on the opposite sides 43 of the plug member 40 have incurved hooks that curve or hook from the respective side 43 in a direction toward the other side 43. The projections 30 each have incurved barbs 120 that curve or hook back towards the respective sides 25 of the channel 23. The hooks forming the barbs 45 make positive, interactive engagement with the incurved barbs 120 on the projections 30 of the channel 23 to lock the plug member 40 to the channel 23 in an almost indestructible manner.

The plug members 40 are advantageously made of extruded plastic. The plastic is extruded into long strips having the cross section shown in FIG. 8 or other cross section as desired. The long strips are then cut into small pieces that form the plug members 40. Generally the plug members 40 have a length in a direction perpendicular to the cross section as shown in FIG. 8 of a quarter inch to an inch or so.

Figure 6:
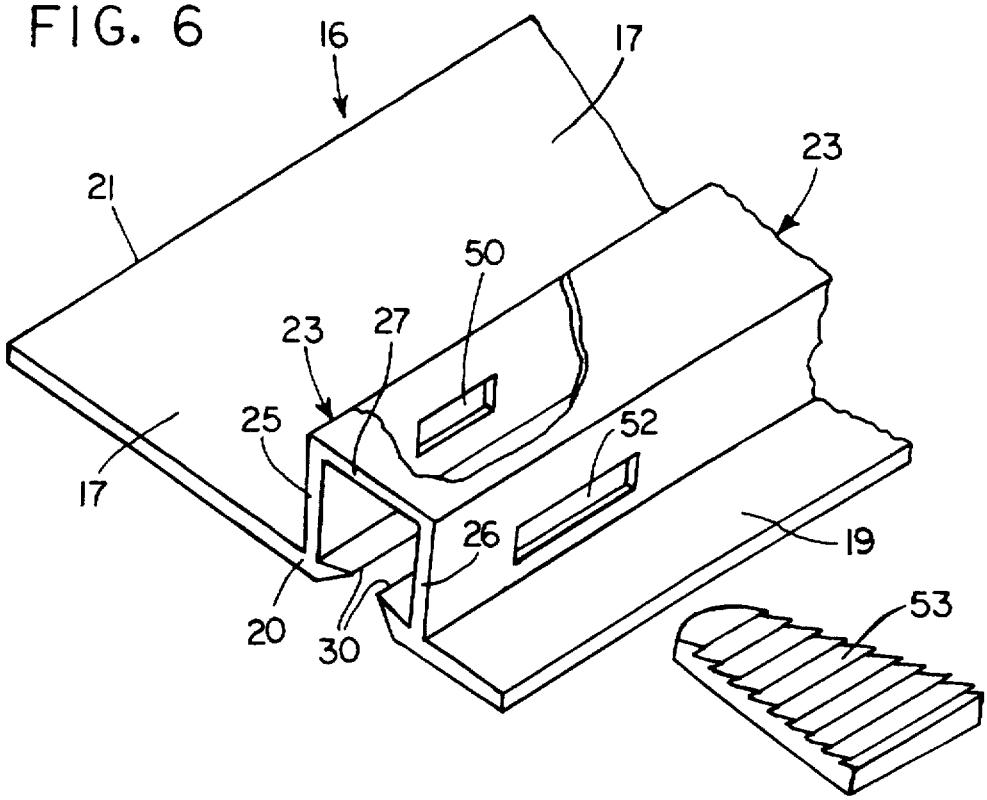
FIG. 6 is a fragmentary pictorial view of a picket member that incorporates a further alternative means of attaching the picket to the chain link fencing.
Figure 7:
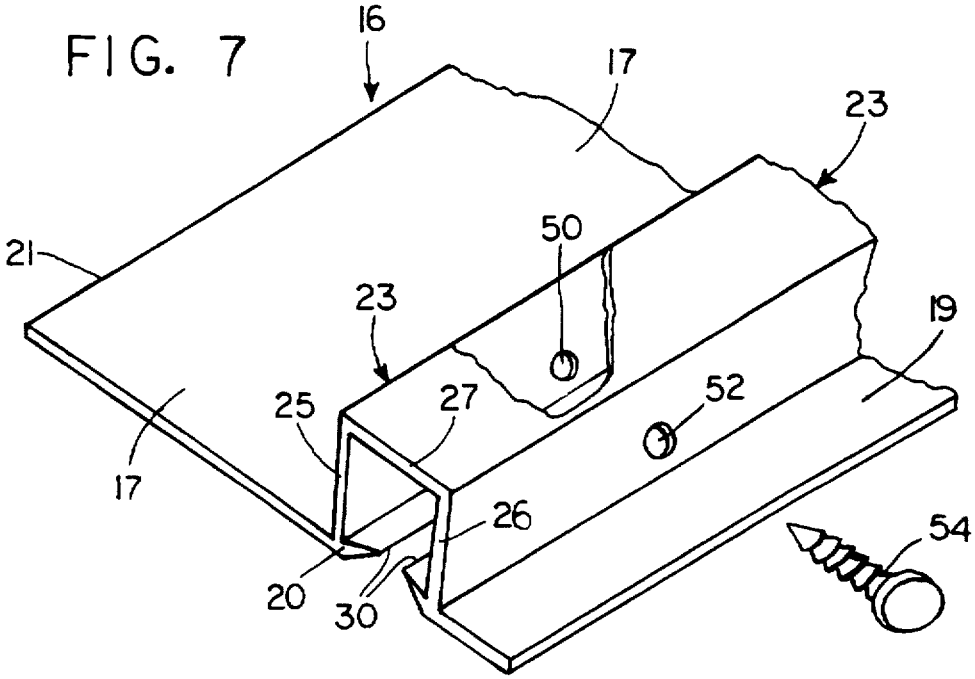
FIG. 7 is a fragmentary pictorial view of a picket member that incorporates a still further alternative means of attaching the picket to the chain link fencing.

Another embodiment of attachment means for attaching the channel 23 of the pickets 16 to the chain link fencing is shown in FIGS. 6 and 7. In this embodiment as illustrated, aligned apertures 50 and 52 are provided in the spaced apart sidewalls 25 and 26 of the channel 23. The apertures 50 and 52 are located adjacent to the open trough at the top side of the channel 23. A clip member, shown as a wedge member 53 in FIG. 6 and a fluted nail member 54 in FIG. 7, extends through the aligned apertures 50 and 52 and across the open trough at the top side of the channel 23 so as to close the top of the channel 23 in the vicinity of the clip member. The wire of link 11 of the chain link fencing is thereby confined or captured in the channel 23. The channel 23 is thus securely interlocked to the chain link fencing by the confining or capturing of the wire of the link 11 in the channel 23. It should be noted here that there need only be one aperture 52 in the channel 23. The aperture 50 can be eliminated if so desired. The clip member (either the wedge member 53 or the fluted nail member 54) would then be held in the aperture 52 so as to extend across the channel 23.

In FIG. 6, the clip member is shown as a flat, wedge shaped member 53, and the apertures 50 and 52 are rectangular in shape so as to receive the wedge shaped member 53 in wedged engagement therewith At least one side of the wedge shaped member 53 is preferably provided with a plurality of teeth spaced therealong so that the teeth engage the respective apertures 50 and 52 to securely wedge and lock the wedge shaped member 53 in the apertures 50 and 52.

In FIG. 7, the clip member is an elongate fluted nail 54, and the apertures 50 and 52 are circular in shape. The circular apertures 50 and 52 of FIG. 7 are sized such that the fluted sides of the nail 54 make tight, frictional engagement with the apertures 50 and 52. It should be recognized that the fluted nail 54 of FIG. 7 could be replaced by a screw which would then be screwed into the two apertures 50 and 52.

Figure 4:
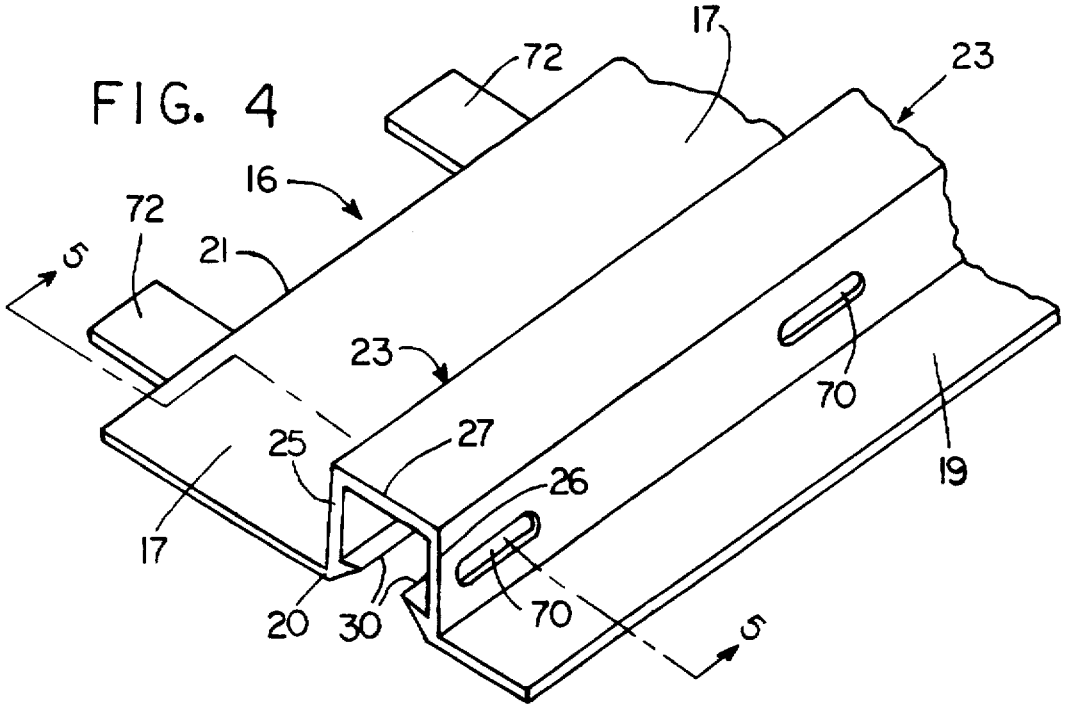
FIG. 4 is a fragmentary pictorial view of a picket that has an alternative means of attaching the picket to the chain link fencing.
Figure 5:
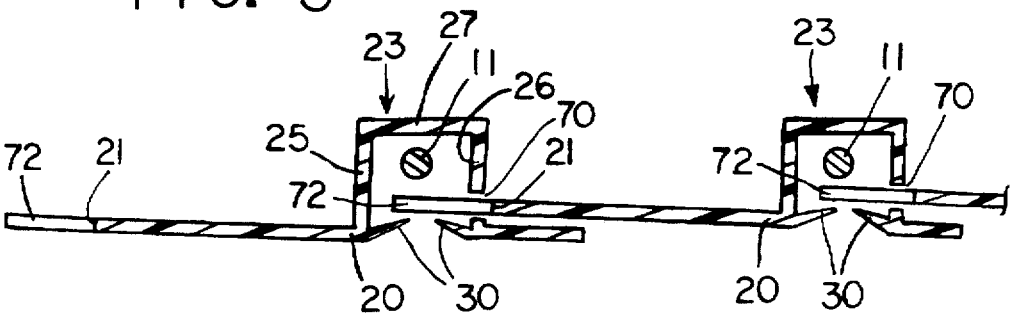
FIG. 5 is a cross section taken along line 5—5 of FIG. 4 but showing two pickets of FIG. 4 as they would be installed on chain link fencing.

Another embodiment of means for attaching the channel 23 of the picket 16 to the chain link fencing is illustrated in FIGS. 4 and 5. In this embodiment, apertures 70 are provided in the sidewalls 25 and 26 of the channel 23. The apertures 70 are spaced apart along the longitudinal length of the channel 23. Projections 72 are provided on the second side 21 of each slat 17. The projections 72 are spaced along the second side 21 of the slat 17 so as to be in alignment with respective apertures 70. As illustrated, the projections 72 are flat tabs that extend from the second side of the slat 17, and the apertures 70 are rectangular in shape so that the tabs can slide through the apertures.

As shown in FIG. 5, the tab or projection 72 slides within a respective aperture 70 in a channel 23 of an adjacent picket member 16 in the chain link fencing. The tab or projection 72 extends across the channel 23 of the adjacent picket member 16 to essentially close the channel 23 and confine the portion of the wire of link 11 of the chain link fencing within the closed channel 23. Each picket 16 is locked in place on the chain link fencing by a tab or projection 72 of an adjacent picket 16 that captures the wire of link 11 in the channel 23.

Figure 10:
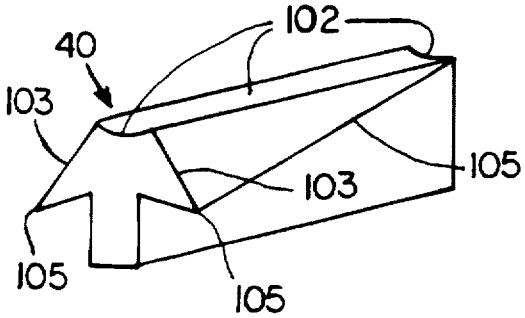
FIG. 10 is a pictorial view of a modified plug member that is very similar to the plug member shown in FIGS. 2 and 9.

A slightly modified embodiment of a plug member 40 is shown in FIG. 10. The plug member 40 shown in FIG. 10 is very similar to the plug member 40 shown in FIGS. 2 and 8. The plug member 40 of FIG. 10 has a curved or flat base portion 102 that will abut the link 11 of the chain link fencing. This base is similar to the base 42 of the embodiment of the plug member 40 shown in FIGS. 2 and 8. The opposite sides 103 of the plug member 40 of FIG. 10 extend backwardly similar to the opposite sides 43 of the plug member 40 shown in FIGS. 2 and 8.

The distinction between the plug member 40 of FIGS. 2 and 8 and that of FIG. 10 is that the sides 103 of the plug member 40 of FIG. 10 have distal side edges that slope from one of the longitudinal ends of the plug member 40 to the other in a direction toward the base 102. Thus, the barbs 105 formed along the longitudinal sides of the plug member 40 shown in FIG. 10 taper to form a wedge-shaped plug 40. The inwardly tapered end of the plug member 40 of FIG. 10 can be introduces into the open slot along the channel 23 to facilitate the sliding insertion of the plug member 40 into the open end of the channel 23.

Figure 11:
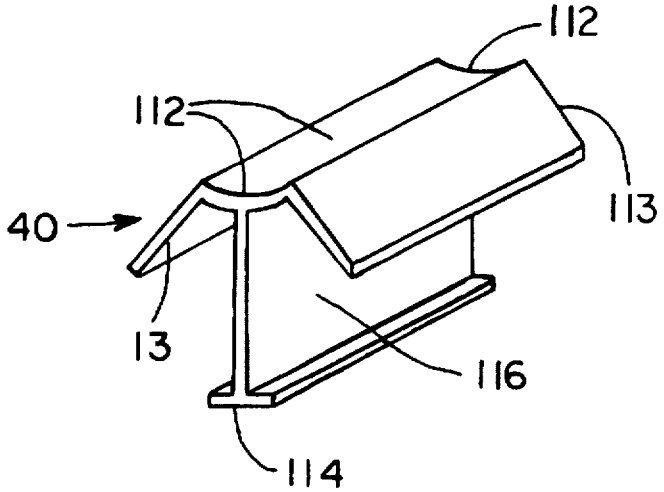
FIG. 11 is a pictorial view of another embodiment of a plug member similar to the plug member shown in FIGS. 2 and 9.

A further embodiment of a plug member 40 is shown in FIG. 11. Again, the plug member 40 of FIG. 11 is similar to the plug member 40 shown in FIGS. 2 and 8. The plug member 40 of FIG. 11 has a base 112 and opposite sides 113 that correspond to the base 42 and sides 43 of the plug member 40 of FIGS. 2 and 8. Instead of having finger engagement portions 46 as shown in FIGS. 2 and 8, the plug member 40 of FIG. 11 has a finger engaging web 116 that extends from the base 112 so as to be positioned between the sides 113, with the web extending outwardly further than the distal edges of the sides 113. The web 116 may have a tab 114 at the distal end of the web 116 to aid in engagement by one's fingers.

Figure 9:
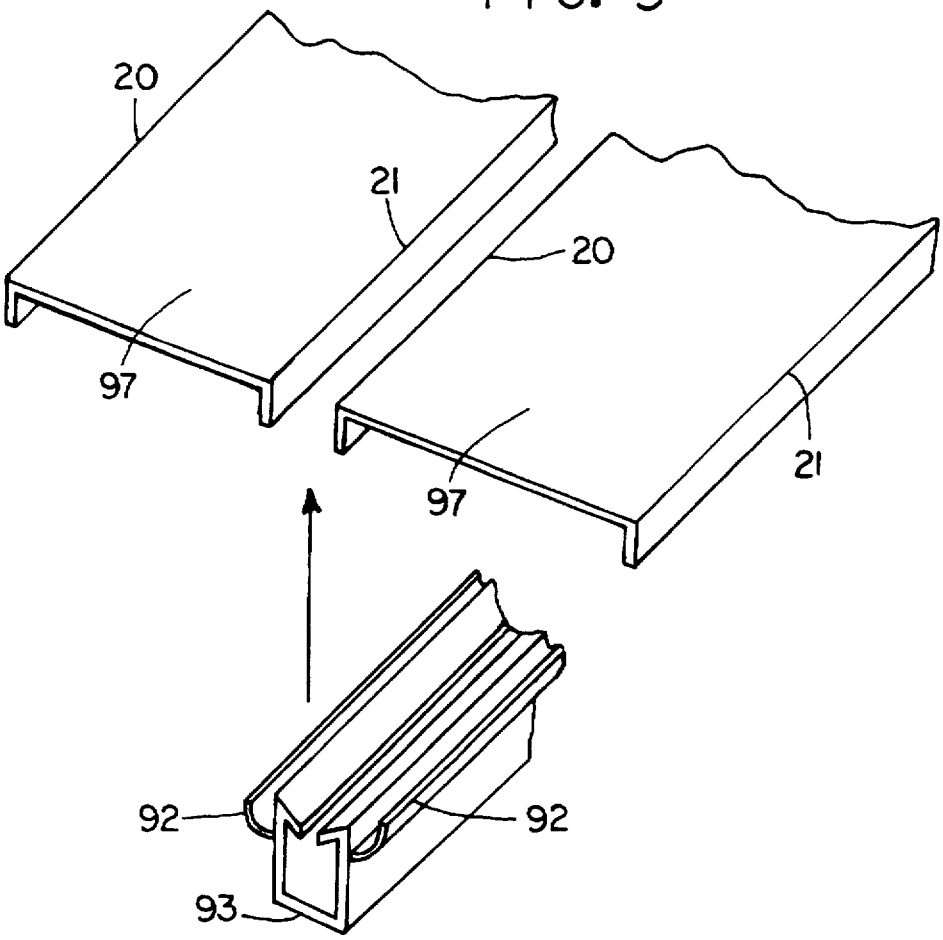
FIG. 9 is an exploded pictorial view of pickets of the present invention comprising slats that lie in valleys of chain link fencing, with separate, distinct channel members that interlock with the knuckles of the chain link fencing as well as the slats to securely retain both the channels and the slats on the chain link fencing.

As mentioned very briefly hereinbefore, the picket member 16 can be formed of two distinct, principal units instead of as an integral unit. The picket member 16 as formed as an integral unit is shown in FIGS. 1–7. The modified embodiment in which the picket member 16 is formed of two separate, distinct units is shown in FIG. 9. The first unit of the embodiment shown in FIG. 9 is a slat 97 that is similar to the slat 17 of the embodiment shown in FIGS. 1–7. However, the slat 97 of the embodiment of FIG. 9 is formed separate and apart from the channel unit 93, whereas the channel portion 23 of the embodiment of FIGS. 1–7 is formed integral with the slat 17.

The slats 97 of the embodiment of FIG. 9 are placed in the valleys of the chain link fencing, and the channels 93 are placed over the row of knuckles at the sides of the slats 97. The channels 93 use the same engagement means for engagement to the fence as described previously for the channel portion 23 of the embodiment shown in FIGS. 1–7. Additional engagement means must be provided on the channel units 93 for restraining the slats 97 in the valleys of the chain link fencing. As illustrated in FIG. 9, opposed ears 92 extend from opposite sides of the channel units 93. The ears 92 engage with the slats 97 and retain the slats in the valleys of the chain link fencing. Advantageously, the ears 92 can be curved so as to engage over lips 94 formed on the side edges of the slats 97.

It should be recognized that each of the embodiments of attachment means shown in the drawings and described herein could be used independent of the others. It is advantageous, however, to use the lips or projections 30 that extend from the sidewalls 25 and 26 of the channel 23 with any of the other attachment means as is illustrated in the drawings. The snap engagement of the lips or projections 30 on the sidewalls 25 and 26 of the channel 23 with the knuckles 18 makes the installation of the pickets fast and easy. The supplemental attachment means can then be used to further secure the pickets 16 to the chain link fencing if so desired.

It is to be understood that the present disclosure, including the detailed description of preferred embodiments, is made by way of example and that various other embodiments are possible without departing from the subject matter coming within the scope of the following claims, which subject matter is regarded as the invention.

We claim:

1. Chain link fencing comprising:

a plurality of *extruded plastic* elongate slats, with each of said slats having first and second elongate sides, and with each slat being of a size to lie in a diagonal valley of the chain link fencing;

an elongate, U-shaped channel formed integrally along a first side of each of said slats, said channel having first and second spaced apart *plastic* sidewalls connected by a *plastic* bottom wall so as to form an elongate open trough along a top side of said channel, with said first side of each slat being integrally attached to the first sidewall of said U-shaped channel such that when said slat is received in said valley, the open trough of said channel fits over a diagonal ridge of knuckles formed along the side of said valley by intertwined wires of the chain link fencing so that said channel covers said diagonal ridge of knuckles and the portions of the wires that extend between and connect the knuckles;

attachment means for securing said U-shaped channel to said diagonal ridge of knuckles that said channel covers, said attachment means comprising:

*integrally formed plastic projections extending from each of the sidewalls adjacent the open trough, the projections of the first sidewall extending toward the second sidewall and the projections of the second sidewall extending toward the first sidewall such that the projections of both sidewalls snap engage with knuckles of the chain link fence;* aligned apertures in the spaced apart sidewalls of said channel, said apertures being located adjacent to the open trough at the top side of said channel; and a clip member that extends through the aligned apertures on the spaced apart sidewalls of the channel and across the open trough at the top side of said channel so as to close the top of the channel at the clip member thereby confining the portion of the wire within the closed channel at the clip member to thereby interlock said channel and the elongate slat attached thereto to the chain link fencing.

2. Chain link fencing in accordance with claim [8] / wherein a second elongate slat is integrally attached to and extends from the second sidewall of each channel such that the second slat will overlap with a corresponding slat in an adjacent valley of the chain link fencing.

3. Chain link fencing in accordance with claim 1 wherein said clip members are wedge shaped and make wedged engagement with said aligned apertures.

4. Chain link fencing in accordance with claim 3 wherein at least one side of said clip members are provided with a plurality of teeth spaced therealong such that the teeth engage with the aperture in said channel.

5. Chain link fencing comprising:

a plurality of elongate slats, with each of said slats having first and second elongate sides, and with each slat being of a size to lie in a diagonal valley of the chain link fencing;

an elongate, U-shaped channel formed integrally along a first side of each of said slats, said channel having first and second spaced apart sidewalls connected by a bottom wall so as to form an elongate open trough along the top side of said channel, with said first side of each slat being [1.1] integrally attached to the first sidewall of said U-shaped channel such that when said slat is received in said valley, the open trough of said channel fits over a diagonal ridge of knuckles formed along the side of said valley by intertwined wires of the chain link fencing so that said channel covers said diagonal ridge of knuckles;

attachment means for securing said U-shaped channel to said diagonal ridge of knuckles that said channel covers, said attachment means comprising:

spaced apart apertures in said sidewalls of said channel; and spaced apart projections extending from the second side of each said slat, said projections being in alignment with said apertures[.];

wherein the projections of each slat extend through a respective aperture in a channel of a corresponding slat in an adjacent valley of the chain link fence such that the projections extend across the channel of the corresponding slat in the adjacent valley so as to close the channel in the corresponding slat and confine the portion of the wire within the closed channel of the corresponding slat in the adjacent valley.

6. Chain link fencing in accordance with claim 5 wherein a second elongate slat is integrally attached to and extends from the second sidewall of each channel such that the second slat will overlap with a corresponding slat in an adjacent valley of the chain link fencing.

*7. A plurality of integral plastic picket members sized and shaped to cover valleys and ridges of a chain link fence, each picket member comprising:*

*(a) an elongate channel, the channel having plastic sidewalls and a plastic bottom wall extending between lower edges of the walls, an upper edge of each of the walls supplied with projections extending toward an opposite wall, the projections adapted to snap engage the knuckles of a chain link fence; and*

*(b) two parallel plastic slats sized to fit within the valleys of the chain link fence, each of the slats integral with the channel and extending outward from the upper edges of the sidewalls of the channel.*

*8. The members of claim 7, wherein the projections are continuous projecting lips.*

*9. The members of claim 7, wherein the projections slant toward the bottom wall to form barb-like engagement members.*

*10. The members of claim 9, wherein the barb-like engagement members of the projections are adapted to engage indentations on opposite sides of the knuckles of a chain-link fence.*

*11. The members of claim 7, wherein one of the slats is wider than the other.*

*12. The members of claim 7, wherein the picket member further comprises:*

*(c) aligned apertures in the sidewalls adjacent an open end of the channel; and*

*(d) a clip extending through the aligned apertures and across the channel to confine the wire of a chain link fence between the channel bottom wall and the clip.*

*13. A plurality of picket members for converting a chain link fence to a privacy fence, each picket member comprising:*

*an extruded plastic picket member body, the member body adapted for attachment to a chain link fence to cover the valleys and ridges of the fence, the member body comprising:*

*(a) two parallel elongate slats, a first of the slats wider than a second, both first and second slats sized to lie in valleys of a chain link fence;*

*(b) an elongate channel formed between the slats, the channel having first and second spaced-apart sidewalls with upper and lower ends, a bottom wall extending between the lower ends of the sidewalls, the elongate slats each integral with, and extending outward from, the upper ends of the sidewalls; and*

*(c) projections extending from the upper ends of each of the sidewalls toward an opposite sidewall the projections comprising barbs, the barbs adapted for snap engagement with indentations on opposite sides of the knuckles of the ridges of a chain link fence.*

*14. A picket member for converting an open mesh chain link fence to a privacy fence, the picket member comprising:*

*an integral extruded plastic picket member body, the member body adapted for mounting on a chain link fence to cover the valleys and ridges of the fence, the member body comprising:*

*(a) two parallel elongate plastic slats, each of the slats sized to lie in the valleys of the chain link fence; and*

*(b) an elongate U-shaped channel formed integrally between the slats, the channel having sidewalls, each wall having projections extending toward the opposite wall, the projections adapted for snap engagement with the knuckles of the ridges of a chain link fence.*

* * * * *